United States Patent
Trevisi

(10) Patent No.: US 7,876,208 B2
(45) Date of Patent: Jan. 25, 2011

(54) SYSTEM FOR SIGNALLING AND LOCATING VEHICLES INVOLVED IN ACCIDENTS, STOPPED VEHICLES AND VEHICLES WITH MECHANICAL PROBLEMS

(76) Inventor: Carlos Maria Trevisi, C/Serano 85, E-28006 Madrid (ES)

( * ) Notice: Subject to any disclaimer, the term of this patent is extended or adjusted under 35 U.S.C. 154(b) by 168 days.

(21) Appl. No.: 11/992,085

(22) PCT Filed: Sep. 7, 2006

(86) PCT No.: PCT/ES2006/000506
§ 371 (c)(1),
(2), (4) Date: Mar. 13, 2008

(87) PCT Pub. No.: WO2007/031587
PCT Pub. Date: Mar. 22, 2007

(65) Prior Publication Data
US 2009/0261964 A1     Oct. 22, 2009

(30) Foreign Application Priority Data
Sep. 13, 2005   (AR) ............................... P050103825

(51) Int. Cl.
*B60Q 1/52* (2006.01)
*G08B 5/00* (2006.01)

(52) U.S. Cl. .................. 340/471; 340/472; 340/946; 340/950; 340/977

(58) Field of Classification Search ................ 340/946, 340/950, 956, 945, 984, 425.5, 426.15, 426.16, 340/426.19, 426.23, 426.25, 850, 977, 471, 340/472
See application file for complete search history.

(56) References Cited

U.S. PATENT DOCUMENTS 2,923,917 A     2/1960   McPherson et al.

(Continued)

FOREIGN PATENT DOCUMENTS

DE              2459335         7/1976

(Continued)

*Primary Examiner*—Daniel Wu
*Assistant Examiner*—Rufus Point
(74) *Attorney, Agent, or Firm*—Horst Kasper

(57) ABSTRACT

The invention relates to a system for signalling and locating vehicles involved in accidents, stopped vehicles and vehicles with mechanical problems in daytime and night-time conditions as well as in adverse weather conditions. According to the invention, the occupants of the vehicle can raise the alarm without leaving the vehicle such as to avoid any physical risk. The invention comprises a case and a hinged cover housing an air container. One end of the air container is connected to a gaseous fluid outlet pipe and to a manual quick-opening non-return valve which is located in the mouth of an empty aerostatic inflatable fluorescent body. The aforementioned body is folded inside the case when not in use and is deployed in the event of a vehicle impact by means of a device comprising an inertia sensor which is activated by a deceleration force exceeding 3G and which is powered by a power source comprising batteries or accumulators belonging to the electric circuit of the vehicle or independent batteries. Said source is solidly connected to an electrically-conductive cable terminating in a connector which is associated with a light flashing apparatus comprising an electronic flash unit, a light sensor which operates at night and a satellite-based mini-localizer comprising a global positioning system (GPS).

14 Claims, 3 Drawing Sheets

U.S. PATENT DOCUMENTS

| | | | |
|---|---|---|---|
| 3,088,136 A * | 5/1963 | Kauffman et al. | 441/7 |
| 3,601,797 A * | 8/1971 | Connor | 340/473 |
| 4,052,955 A * | 10/1977 | Haushalter | 116/210 |
| 4,433,638 A * | 2/1984 | Ashline | 116/210 |
| 4,768,739 A * | 9/1988 | Schnee | 244/146 |
| 5,031,931 A * | 7/1991 | Thuen et al. | 280/735 |
| 5,612,882 A * | 3/1997 | LeFebvre et al. | 701/209 |
| 6,178,985 B1 * | 1/2001 | Robinson | 137/195 |
| 6,628,941 B2 * | 9/2003 | Knoblach et al. | 455/431 |
| 7,356,390 B2 * | 4/2008 | Knoblach et al. | 701/4 |

FOREIGN PATENT DOCUMENTS

| | | |
|---|---|---|
| DE | 2126768 | 3/1984 |
| DE | 29720712 | 1/1998 |
| FR | 2761312 | 10/1998 |
| WO | 04001691 | 12/2003 |

* cited by examiner

SYSTEM FOR SIGNALLING AND LOCATING VEHICLES INVOLVED IN ACCIDENTS, STOPPED VEHICLES AND VEHICLES WITH MECHANICAL PROBLEMS

SCOPE

The invention relates to a system for signalling and locating vehicles involved in accidents, stopped vehicles and vehicles with mechanical problems, that allows to provide a visible warning signal in cases of demand of aid, emergency situations, or any other case, in witch it agrees to signalize a certain point of location suitably.

ANTECEDENTS OF THE INVENTION

The proliferation of traffic accidents together with the innovations of new automobile models, the great capacities that becoming installed in all the brands, together with the new road and communication infrastructures, the freeways, the highways, the new components installed on these roads, have put on alert the automobile engineers that continuously study the security of the vehicle occupants in general.

Until the present they lead us to a great risk for the human life on the roads and/or fast routes for the circulation of vehicles. In fact, being fields where the automotors develop generally high speeds, it is recommended not to descend from them, in case of accident and/or mechanical damages.

In the last year, the employment of fluorescent vests of obligatory use has been stated in European countries, with the purpose of protecting the human life, for every person who descends from a vehicle, on roads or freeways, among other things, for the positioning of the triangle beacons signalizing damages and/or stoppings.

In the state of the art there are systems, devices, beacons with diverse essential signalling and location elements, published in documents of patents that deserve to be expounded because of their importance in vehicles in general and for the aid of people, among which we can mention:

Spanish Patent IS 2.168.947, discloses a positional signaler with static aerobeacon and satellite-based mini-localizer, for the rescue in sea, aerial or terrestrial accidents, couplable to conventional life jackets, sportswear and working clothes.

French Patent FR 2.733.434, discloses an inflatable kit used as emergency signalling element.

English Patents GB 2.325.067, GB 2.229.424, and GB 2.039.120, that disclose inflatable devices/beacons for signalizing and locating people in dangerous situations or losses.

American U.S. Pat. No. 6,195,039, U.S. 2004142613, U.S. Pat. No. 3,930,448 and U.S. Pat. No. 4,295,438, which disclose different inflatable apparatuses or devices or beacons, that allow to emit a luminous and transmission signal to locate the emergency situation by different means and to be able to rescue the people.

the Argentinian Patents and publications AR 245,048, AR 239,794, AR 5 240,108 and 033,535 AR A4, that disclose radio beacon inflatable devices for the indication of obstacles, preferably vehicles, in emergency situations or failures.

we also mention other published patent documents that deserve to be commented because of their importance in the previous art: FR 2.594.244, IS 195,566, IS 1.029.889, U.S. Pat. No. 4,633,215, U.S. Pat. No. 3,895, 348, U.S. Pat. No. 4,052,697, IS 2.206.577, OF 19825074 and WO 9115266, that disclose different modalities of signaling and location of vehicles systems in general.

The object of the proposed invention has identical purpose but with differential characteristics regarding the aforementioned patent publications like:

the system is activated automatically or manually from the inside of the vehicle, wherein the occupants give notice without descending to the road, saving its physical integrity.

It has different means for the emission of luminous help signals, that allow a signaling and continuous and immediate location, both in daytime and night-time conditions as well as in adverse weather conditions, avoiding later collisions and essentially protecting the human life of everyone.

Greater visible and reflecting safe operation surface (fluorescent), particularly that doesn't run the risk of self-obturation, of simple construction lowering the manufacture costs, and so the use of it is possible also on boats, aircrafts and vehicles providing a signalling saving orographic obstacles such as mounts, hills, mountains, forests, undergrowths, marshes, etc.

its design, a long lifespan and low maintenance cost, as well as its simple replacement in emergency cases because of failures or breakdowns, have been considered as well.

OBJECT OF THE INVENTION

Starting from the present state and from the aforementioned previous state of the art, the concrete object of the invention is based on a system comprising a case of resistant material including inside of it all the necessary elements for its correct operation and offering a fast and effective signalling or location of vehicles in general, visible at greater distance because of its high structure, being put into operation from the inside of the cab, so that it is not required to descend from the vehicle, being this system composed mainly of:

Case and hinged cover of resistant material.

Container (big bottle) for supplying and dispenser for gaseous fluid under pressure.

Means with automatic or manual activation mechanisms.

Aerostatic inflatable body (globe), preferably of spherical form, fluorescent and visible in all directions such as at high altitude, in 360° and specially at long distance.

electric power supply source, means for tracking the position and sparkling lighting signal emitter.

BRIEF DESCRIPTION OF THE DRAWINGS

The FIG. 1 shows a schematic representation of the activated system, applied on the outside of an automotive vehicle.

The FIG. 2 shows a schematic representation of the activated system, located from different strategically important points of an automotive vehicle.

Figure 3:
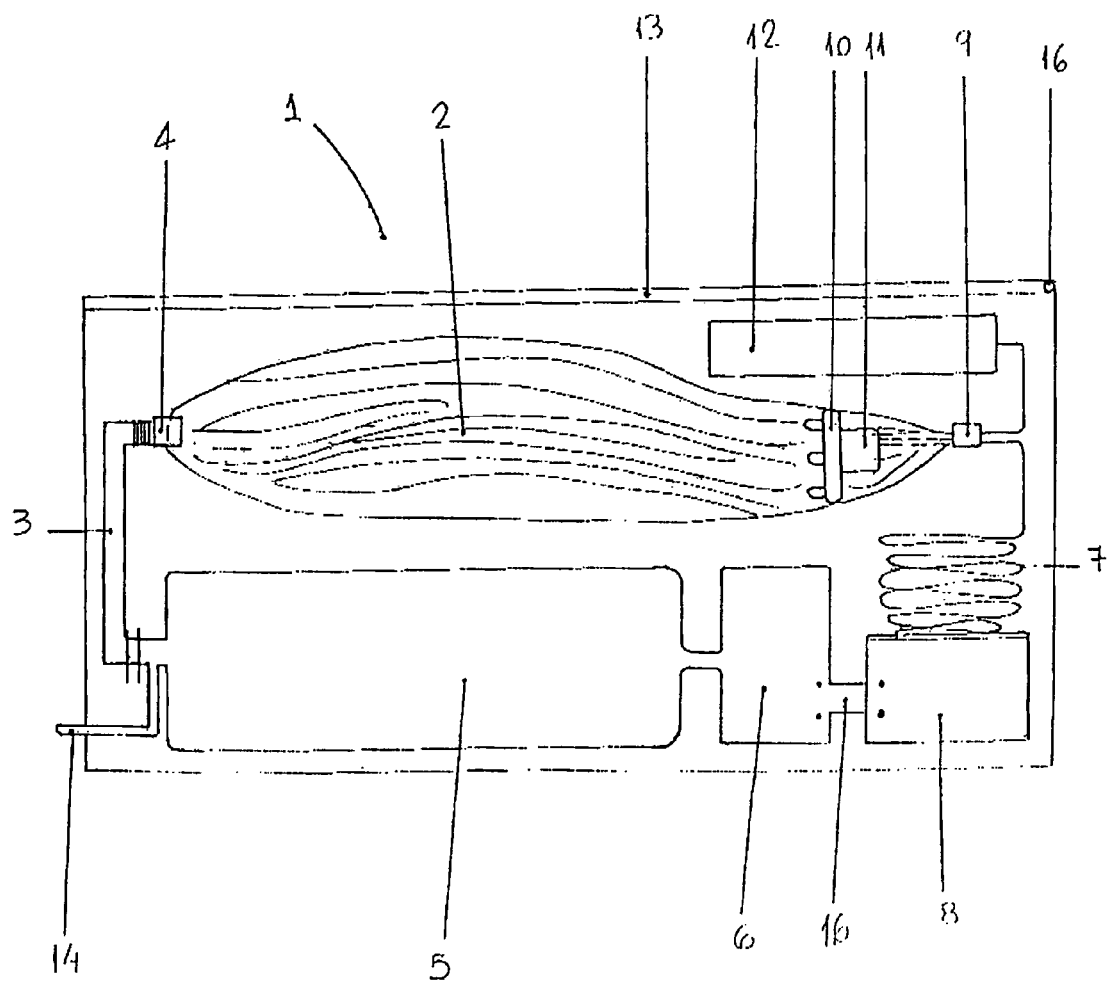

The FIG. 3 shows a schematic representation of the different essential technical elements that associated to each other define the system characteristics in inoperative work conditions.

DETAILED DESCRIPTION OF THE INVENTION

According to FIG. 3, the characteristic elements conforming the system are:

1. Watertight case of resistant material.

2. Inflatable body (globe) of fluorescent plastic material.

3. Gaseous fluid outlet pipe.

4. Check and gaseous fluid expulsion valve.

5. Container (big bottle) for supplying and dispenser for gaseous fluid under pressure.

6. Device with inertial sensor.

7. Conductor bipolar flexible supporting cable.

8. Supply electrical power source (battery or accumulator)

9. Connector.

10. Light flasher with electronic flash.

11. Light sensor operating at night.

12. Satellite-based mini-localizer with global positioning system (GPS)

13. Cover housing.

14. Manual drive mean.

15. Switch of the inertial activation device.

16. Joint mean.

17. Telescopic location rod.

BRIEF DESCRIPTION AND OPERATION PRINCIPLE

When an impact or casual crash of the vehicle has taken place through a traffic accident, collision or overturns, it occurs a shocking deceleration that automatically activates the system according to a range of better regulation of a deceleration force higher than 3G. It also will be considered for its design if one crashes at low speeds; for example, this automatic system won't be activated at 5 km/h.

When a car crashes against something, the car moving at certain speed practically stops. At certain speed the car has a great energy (due to its weight and speed) and at the time of the impact all that energy dissipates by different ways (it is necessary to remember the law of the energy conservation).

The cars used to be very hard (designed not to get dented) and then the persons were who suffered since the car didn't absorb energy; on the other hand, now the cars are designed to bend in a predetermined manner thus to absorb a great part of the energy and so that the occupants undergo an inferior deceleration and therefore less injuries. Since it is a system acting in case of accident, the installation of at least a number of cases per vehicle must be contemplated, only one of them will be activated, according to the impact or requirement.

They can be installed in the vehicle in a minimum amount of four units, two of them widthways opposite in the middle of the ceiling and two of them in equal conditions in the external inferior part of this vehicle, always existing a case with a signaler and localizer system.

The cases are independent, containing all the necessary elements for their operation, and can leave the factory according to the criterion of the manufacturer.

When gathering an impact an inertial device (6) activates in this vehicle according to a force of deceleration exceeding 3G, hitting on a container (5) with helium or hydrogen or another gas of smaller specific weight than the air, connected by an extreme to an outlet pipe (3) for the passage of the gas causing quickly the opening of the anti-return valve (4) for inflating an aerostatic body (2) (globe) of fluorescent tonality.

When this aerostatic globe begins to inflate it reaches a point in which the cover housing (13) is made turn or jump to the side of this case by means of the joint means (16), this happening when approximately the half of the load enters. When opening, the case makes the globe become liberated and vertically unfolded up to a height of 10 meters or more in earth-sky direction, so that the occupants give notice of the damage without descending to the road, saving their physical integrity.

The inertial device (6) is powered by a power source comprising batteries or accumulators belonging to the own electric circuit of said vehicle or independent batteries, and is solidly connected to an flexible electrically-conductive supporting cable (7) and terminating in a connector (9) with a light flasher comprising an electronic flash unit, a light sensor (11) operating at night and a satellite-based mini-localizer (12) with a global positioning system (GPS).

The aerostatic globe connected to an electrically-conductive supporting cable (7) and finalizing to a connector (3) associated with a light flasher (10) with electronic flash, to a light sensor operating at night (11) and to a satellite-based mini-localizer (12) with a global positioning system (GPS), can be held approximately for 7 days.

Once the inflatable body (2) has fulfilled its mission, it can be collected and deflated by means of the manual opening of the anti-return valve (4), after what it can be folded and located within the case, connecting the rest of elements in the disposition allowing a new employment of the system.

Figure 1:
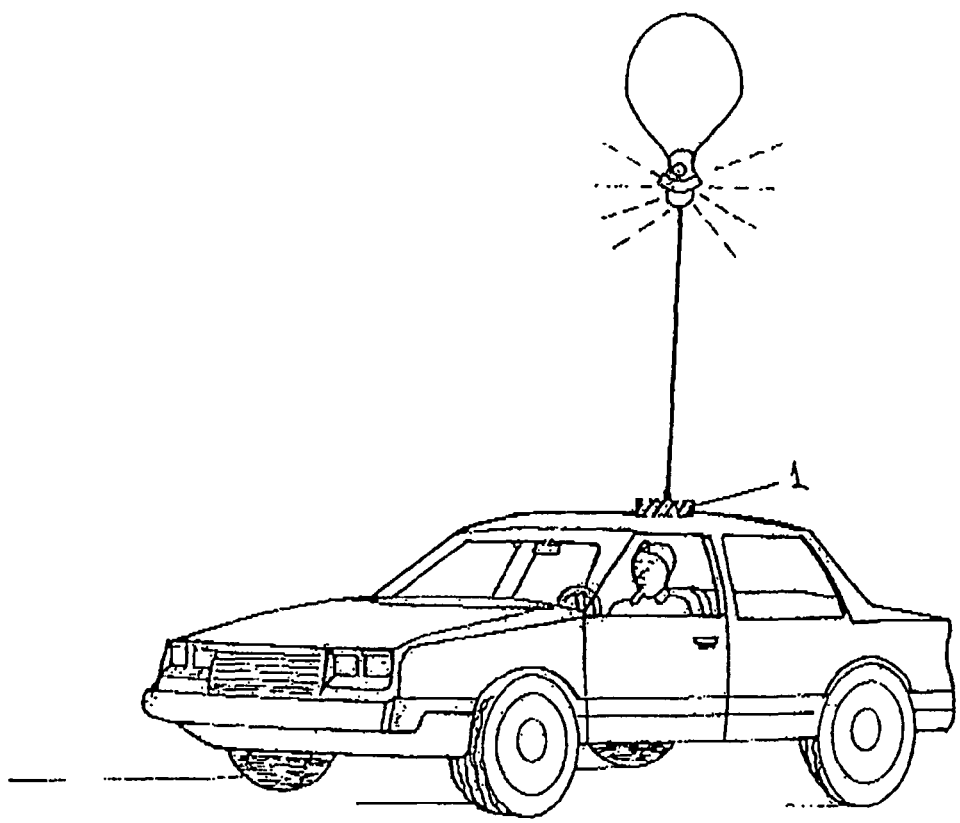
Figure 2:
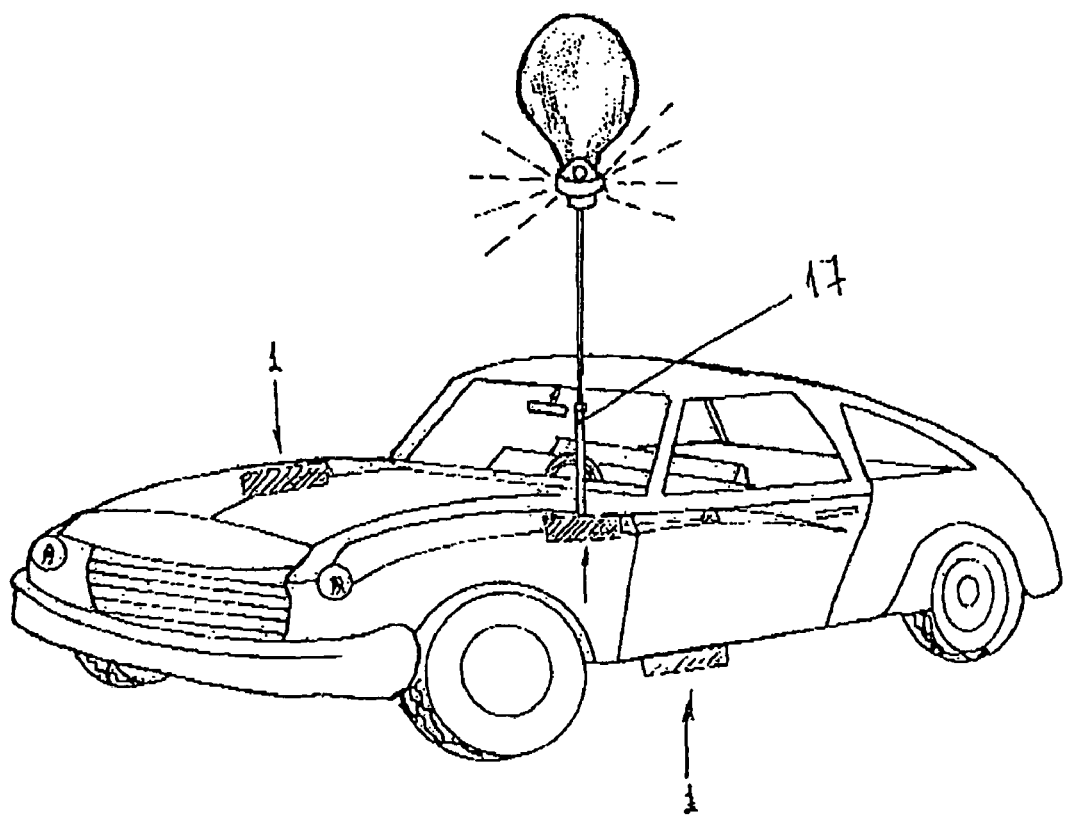

According to FIG. 2, a modality is shown including the conductive support cable (7) commonly bound to a telescopic location rod (17), like the one of the electrical aerials, also located in places where the structures are not affected when hitting or colliding vehicles, activated from the inside of the vehicle.

Another modality of system application is the employment of the case independently and as complementary accessory, being able to be taken underneath the conductor's seat and to be removed, if necessary, supporting it on the roof of the vehicle stuck on with magnets or another means and being shot in earth-sky direction by means of a manual drive or by direct contact on this ceiling.

Among the materials to be used in the manufacture of the present system the following ones are to be mentioned as an example and without restricting character: The aerostatic globe consists of synthetic plastic weaves or other materials, and its surface presents fluorescent colours for a greater visibility.

The conductive support cable is of high resistance glass or optical fiber material covered with a substance that becomes rigid in contact with the air.

The telescopic location rod is made of metallic material like stainless steel, aluminium, etc.

According to all the precedingly exposed and illustrated, it is easy to understand the advantages of practical order offered by the system able for the signalling and location of vehicles involved in accidents, stopped vehicles and vehicles with mechanical problems, therefore covering the attached claims the scope of the invention.

The invention claimed is:

1. System able for the signalling and location of vehicles involved in accidents, stopped vehicles and vehicles with mechanical problems, both in daytime and nighttime conditions as well as in adverse weather conditions, and the occupants give notice without descending to the road, saving its physical integrity, characterized in that it comprises a case and a cover of resistant material (1,13) both connected by means of a joint (16), including in its inside a container (5) of helium or hydrogen or another gas of smaller specific weight than air, connected by an end to a gaseous fluid outlet pipe (3) and to an anti-return valve (4) equipped with manual fast opening and located in the mouth of an empty inflatable fluorescent aerostatic body (2) folded in inoperative condition within this case, and that gets shot by gathering an impact in this vehicle by the effect of a device with inertial sensor (6) activated according to a deceleration force exceeding 3G, and is powered by a power source comprising batteries or accumulators belonging to the own electric circuit of said vehicle or independent batteries, this source being solidly connected to a flexible electrically-conductive supporting cable (7) and terminating in a connector (9) with a light flasher comprising an electronic flash unit, a light sensor (11) operating at night and a satellite-based mini-localizer (12) with a global positioning system (GPS).

2. System able for the signalling and location of vehicles involved in accidents, stopped vehicles and vehicles with mechanical problems, according to claim 1, characterized in having manual drive means (14) activated from the inside of the vehicle.

3. System able for the signalling and location of vehicles involved in accidents, stopped vehicles and vehicles with mechanical problems, according to claim 1, characterized in that the electrically-conductive supporting cable (7) is commonly bound to a telescopic location rod (17) activated from the inside of the vehicle.

4. System able for the signalling and location of vehicles involved in accidents, stopped vehicles and vehicles with mechanical problems, according to claim 1, characterized in that the case (1) is used independently and as complementary accessory, taking it under the conductor's seat and removing it, if necessary, supporting it on the roof of the vehicle stuck on with magnets or another means and shooting it in earth-sky direction by means of a manual drive or by direct contact on this roof.

5. A system capable of signalling and locating of vehicles involved in accidents, stopped vehicles and vehicles with mechanical problems, both in daytime and nighttime conditions as well as in adverse weather conditions, and wherein occupants give notice without descending to the road, saving its physical integrity, wherein the system comprises a case (1) made of resistant material;
a cover (13) made of resistant material for covering the case (1);
a joint (16) connecting the case (1) and the cover (13);
a container (5) of helium or hydrogen or another gas of smaller specific weight than air disposed in the case covered by the cover (13);
a gaseous fluid outlet pipe (3) connected at an end to the container (5);
an anti-return valve (4) connected to the gaseous fluid outlet pipe (3) and equipped with a manual fast opening;
an empty inflatable fluorescent aerostatic body (2) having a mouth and folded in inoperative condition within the case (1), wherein the manual fast opening is located at the mouth;
a device with inertial sensor (6) is triggered by gathering an impact in this vehicle by an effect on the device with the inertial sensor (6) activated according to a deceleration force exceeding 3G;
an electrical power source (8) comprising batteries or accumulators belonging to the own electric circuit of said vehicle or independent batteries for powering the device with the inertial sensor (6);
a flexible electrically-conductive supporting cable (7) solidly connected to the power source (8);
a connector (9), wherein the flexible electrically conductive supporting cable (7) terminates in a connector (9);
a light flasher (10) comprising an electronic flash unit and connected to the connector (9);
a light sensor (11) connected to the connector (9) and operating at night; and
a satellite-based mini-localizer (12) with, a global positioning system (GPS) and connected to the connector.

6. The system capable of signalling and locating of vehicles involved in accidents, stopped vehicles and vehicles with mechanical problems, according to claim 5, further comprising manual drive means (14) activated from the inside of the vehicle.

7. The system capable of signalling and locating of vehicles involved in accidents, stopped vehicles and vehicles with mechanical problems, according to claim 5, further comprising a telescopic location rod (17) activated from the inside of the vehicle (5), wherein the electrically-conductive supporting cable (7) is commonly bound to the telescopic location rod (17).

8. The system capable of signalling and locating of vehicles involved in accidents, stopped vehicles and vehicles with mechanical problems, according to claim 5, wherein the case (1) is used independently and as complementary accessory, for taking the case (1) under the conductor's seat and for removing the case (1), if desired, and supporting the case (1) on a roof of the vehicle stuck on with magnets or another means and shooting the case (1) in earth-sky direction by means of a manual drive or by direct contact on the roof.

9. The system capable of signalling and locating of vehicles involved in accidents, stopped vehicles and vehicles with mechanical problems, according to claim 5, further comprising a switch (15) of the inertial activation device connected to the electrical power source (8) and to the device with an inertial sensor (6).

10. The system capable of signalling and locating of vehicles involved in accidents, stopped vehicles and vehicles with mechanical problems, according to claim 5, wherein at least four systems are installed as units in a motor vehicle, of which two are installed widthways opposite in the middle of the ceiling and two are installed in equal conditions in the external inferior part of the motor vehicle;
wherein the cases are independent and wherein upon an impact of the motor vehicle then an inertial device (6) activates based on a force of deceleration exceeding 3G, and gas becomes released from the container (5) to feed the gaseous fluid outlet pipe (3) for the passage of the gas for causing quickly an opening of the anti-return valve (4) for inflating the inflatable fluorescent aerostatic body (2).

11. The system capable of signalling and locating of vehicles involved in accidents, stopped vehicles and vehicles with mechanical problems, according to claim 5, further comprising
joint means (16) attaching the cover (13) to the case (1);
wherein the inflatable fluorescent aerostatic body (2) begins to inflate, wherein there is a point during the inflation of the inflatable fluorescent aerostatic body (2) at which the cover is made to turn or jump open to a side of the case (1) by way of the joint means (16) and wherein this occurs when approximately half of the gas load enters the inflatable fluorescent aerostatic body (2), wherein when opening the case (1) liberates the inflatable fluorescent aerostatic body (2) and wherein the inflatable fluorescent aerostatic body (2) vertically unfolds up to a height of 10 meters or more in earth-sky direction, such that the passengers give notice of the accident without descending to the road and can save their integrity.

12. The system capable of signalling and locating of vehicles involved in accidents, stopped vehicles and vehicles with mechanical problems, according to claim 11, further comprising a manual opening of the anti-return valve (4), wherein the inflatable fluorescent aerostatic body (2) fulfills its mission and is collected and deflated by means of the manual opening of the anti-return valve (4), wherein the inflatable fluorescent aerostatic body (2) is folded and located in the case (1) and wherein a remainder of elements are connected in a disposition allowing a new disposition of the system.

13. The system capable of signalling and locating of vehicles involved in accidents, stopped vehicles and vehicles with mechanical problems, according to claim 11, wherein the inflatable fluorescent aerostatic body consists of synthetic plastic weaves and wherein a surface of the inflatable fluorescent aerostatic body (2) presents fluorescent colors for a greater visibility;

wherein the conductive support cable (7) I made of high resistance glass or optical fiber material covered with a substance which becomes rigid in contact with air; and wherein a telescopic location rod is made of stainless steel or aluminum.

14. The system capable of signalling and locating of vehicles involved in accidents, stopped vehicles and vehicles with mechanical problems, according to claim 5, wherein the case (1) is formed elongated;

wherein the inflatable fluorescent aerostatic body (2) is formed elongated in its rest position;

wherein the container (5) is formed elongated;

wherein the container (5) and the inflatable fluorescent aerostatic body (2) are placed side by side into the case with a substantial parallel alignment of the elongation directions.

* * * * *